Figure 1:
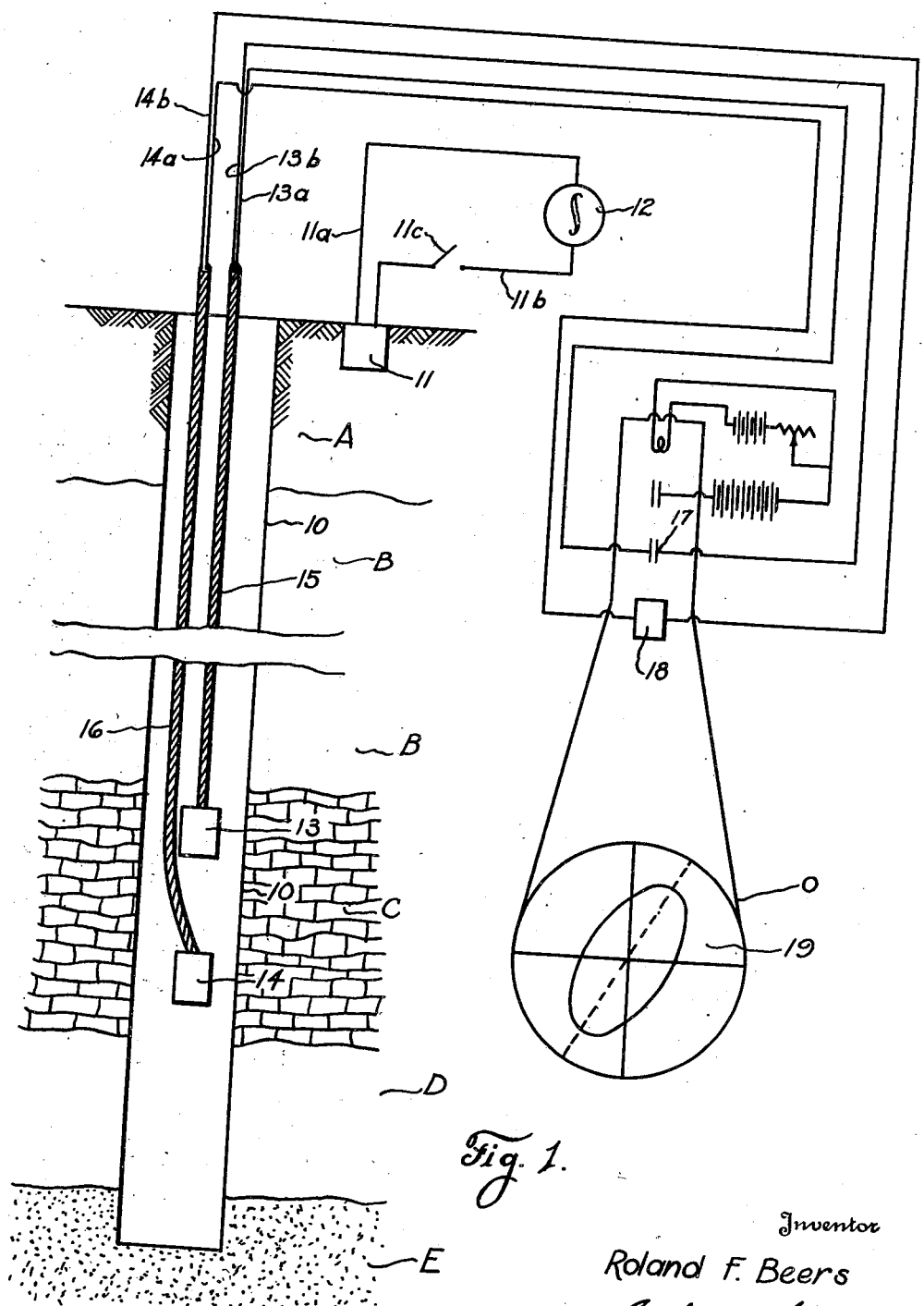

July 15, 1941.  R. F. BEERS  2,249,108
MEANS FOR ANALYZING AND DETERMINING GEOLOGIC STRATA
Filed April 27, 1939

Inventor
Roland F. Beers
By Jack A. Athley
Attorney

Patented July 15, 1941

2,249,108

UNITED STATES PATENT OFFICE 2,249,108

MEANS FOR ANALYZING AND DETERMINING GEOLOGIC STRATA

Roland F. Beers, Dallas, Tex.

Application April 27, 1939, Serial No. 270,389

4 Claims. (Cl. 181—0.5)

This invention relates to new and useful improvements in methods of and means for analyzing and determining the geologic strata below the surface of the earth.

In the search for deposits of petroleum and minerals, it is commonly the practice to determine by correlation the relation of a series of geologic strata below a given point on the surface of the earth to the same series of strata below another point removed at some distance. Correlation of a recognizable series of strata is primarily a geological problem which depends for its success upon a knowledge of the many different properties of the strata under consideration. These properties become the points of differentiation in the establishment of a sequence of strata which when recognizable at points distant from the one under consideration fixes the correlation uniquely.

The points of differentiation upon which these correlations are based may be geologic, paleontologic and lithologic, in which cases they are problems proper to the field of the geologist who establishes the bases of correlation by minute examination of cuttings taken from a drilling well.

Instances have arisen where the points of differentiation based on the foregoing methods have been inadequate for the establishment of a unique correlation. In such cases, resort has been had to other methods such as by the measurement of the electrical resistivity of formations in situ. Even the use of this method leaves much to be desired and it is one of the objects of this invention to provide an improved method of accurately analyzing and determining characteristics of geologic strata below the earth's surface by means of seismic or sound waves.

An important object of the invention is to provide an improved method wherein sound or seismic waves are electrically generated at the surface of a well bore so as to be transmitted downwardly through the subsurface formations, and the velocity of propagation of said waves through said formations is accurately determined, which information indicates the character or structure of said subsurface formation.

Another object of the invention is to provide an improved method of seismically determining physical characteristics of subsurface formations which includes electrically and continuously generating sound waves at the surface of a well bore and transmitting the same downwardly through the subsurface structure, receiving the sound waves at a pair of spaced points in the well bore, and determining the velocity of propagation of said waves through the subsurface structure by accurately ascertaining the time of reception at each point, whereby the nature and physical properties of the structure may be determined.

A further object of the invention is to provide an improved method of geophysical prospecting which includes, continuously lowering a pair of sound receivers, which are spaced a predetermined and relatively short distance apart, through a well bore, continuously generating sound waves at the surface and directing the same downwardly through the subsurface structure, and continuously recording, at the surface, the time difference in arrival of said waves at said receivers, whereby the velocity of propagation of said waves through the formation is indicated and the changes in the physical and lithologic characteristics of the subsurface formations may be determined.

Still another object of the invention is to provide an improved apparatus for determining changes in physical characteristics of geologic strata which includes an electrically operated sound transmitter for generating and directing sound waves downwardly through the formations below the earth's surface, and a pair of receivers arranged to be lowered through the well bore and being spaced from each other a predetermined distance, for receiving the generated waves after said waves have passed through the formations to indicate the physical and lithologic characteristics of the formations; the apparatus making it possible to analyze or determine thinner subsurface sections or strata, whereby accurate information may be obtained.

A particular object of the invention is to provide an improved apparatus, of the character described, wherein the sound receivers are preferably matched for impedance and phase angle, whereby the difference in time of arrival of seismic waves at the receivers, as indicated by a suitable recording or indicating instrument, will be immediately available for computation to determine the characteristics of the formations through which said waves have passed.

A construction designed to carry out the invention will be hereinafter described, together with other features of the invention.

The invention will be more readily understood from a reading of the following specification and by reference to the accompanying drawing, in which an example of the invention is shown, and wherein:

The figure is a diagrammatical view of an apparatus for carrying out the improved method, and illustrating the receivers lowered within the well bore and electrically connected with an oscillograph.

In the drawing, the numeral 10 designates a bore drilled through the subsurface formations or strata of the earth. As shown, the bore extends successively through the weathered layer A, consisting of soil and other unconsolidated material, the layer B of shale, layer C of limestone, a second layer D of shale and, finally, a layer E of sandstone. These layers have been shown symbolically and have been arbitrarily chosen, merely for the purpose of illustration; manifestly, the bore may traverse different types of subsurface strata or formations and the particular locality in which the bore 10 is drilled determines the geologic section encountered.

In carrying out the invention, for the purpose of investigating the various layers, a transmitter in the form of a seismic oscillator or acoustic generator 11 is mounted at the surface of the earth, preferably adjacent the upper end of the well bore. It is desirable that the oscillator be embedded or buried in the earth, as illustrated in the figure, whereby the sound waves generated thereby are directed downwardly through the subsurface formations. The oscillator is connected by wires 11a and 11b with a suitable A. C. generator 12, whereby the oscillator is excited by the generator, converting the electrical energy delivered thereto into sound energy. The seismic or sound waves generated by the oscillator radiate or travel outwardly in all directions and penetrate into the interior of the earth, traversing the various subsurface formations or strata. A suitable manual switch 11c may be connected in the wire 11b to control the operation of the transmitter.

It is well known that velocity of sound travel through formations varies according to the type or character of material encountered. Thus, the velocity of seismic waves travelling through limestone is different than the velocity of said waves traveling through shale, or other formations. By plotting the seismic wave velocity against depth, the abrupt changes which occur when the lithologic character of the beds changes will be apparent, and by a knowledge of the ranges of velocities found for various types of rock, etc., the kind or character of material encountered can be readily determined. Therefore, it is possible to determine the characteristics of the various strata when the velocity of sound travel therethrough is known.

For receiving the sound waves generated by the transmitter 11, a pair of sound receiving units 13 and 14 are arranged to be lowered through the bore hole 10. The receiver units may be of any suitable construction as, for example, each may be an electromagnetic device, similar in construction to the transmitter. The receiver 13 is attached to the lower end of a cable 15 and suitable conductors or wires 13a and 13b lead from the unit and extend upwardly through the cable. The second receiving unit 14 is secured to the lower end of a second cable 16, through which conductors or wires 14a and 14b, which lead from said receiving unit, extend. The cables 15 and 16 may be wound on a suitable drum or drums (not shown) located at the surface, whereby the receiving units may be simultaneously lowered through the bore at exactly the same rate of speed. The unit 14 is spaced from the unit 13 a predetermined distance and this spacing or relative position of the units is maintained throughout the lowering operation. The spacing between the receiving units is subject to variation but it is preferable that said units are spaced relatively close together so that a relatively thin stratum or formation will be indicated, as will be explained. It has been found that efficient results have been obtained by spacing the receiving units three feet apart but the invention is not to be limited to this figure, which is illustrative only.

In operation, the receiving units 13 and 14 are lowered through the well bore 10 and the generator 12 is operated to excite the transmitter or oscillator 11 so that sound is generated and transmitted into the subsurface formations. The sound waves traverse the formations and arrive first at the uppermost receiver 13 in the bore and then at the lowermost receiver 14. The difference in time of arrival of the sound at the two receivers indicates the velocity of the waves or the time required for said waves to travel through the formation or strata which is between the two receivers 13 and 14. As explained, the velocity is dependent upon the characteristics and properties of the formation and, therefore, said characteristics and properties may be determined by noting this time difference.

It is pointed out that any fluid which may be present in the well bore will not affect the reception of the sound waves travelling to the receivers for it is well known that sound will travel through a formation in situ at a relatively greater velocity than through a column of fluid. Therefore, the generated sound, which passes through the subsurface strata, will reach the receivers 13 and 14 prior to the sound travelling through any fluid column in the well bore and the efficiency of the device will not be affected by the presence or absence of fluid in the well bore.

A sound wave, arriving at the electromagnetic receiver 13, produces an electric voltage therein which is transmitted by the wires 13a and 13b to the indicating or recording equipment at the surface. Similarly, a sound wave, arriving at the receiver 14 produces an electric voltage therein and this voltage is transmitted to the indicating equipment at the surface by the wires 14a and 14b. By noting the time difference between the reception of the wave by the upper receiver 13 and the reception of said wave by the lower receiver 14, it is possible to determine the velocity of propagation of the wave through the formation or stratum between said receivers. This velocity, as has been pointed out, varies with the type of formation and, thus, changes in the formations may be readily observed and the properties and characteristics of such formations ascertained.

Any suitable indicating or recording instrument may be employed for measuring the difference in the arrival time of the sound waves at the receiving units 13 and 14, but it has been found that a cathode-ray oscillograph is satisfactory. Such an oscillograph O, as may be purchased on the open market, is diagrammatically illustrated and, as shown, the wires 13a and 13b, which lead from the receiver 13, are connected to one pair of deflection plates 17 of said instrument. The wires 14a and 14b, which have connections with the receiver 14, are connected to the other pair of deflection plates 18 of the oscillograph. The voltages which are produced in the receiving units 13 and 14 by the reception of sound waves are conducted to the deflection plates of the oscillograph and produce a deflection of the electron beam focused on the fluorescent screen 19 of said oscillograph. To those well versed in the art, it is manifest that the pattern of wave form which appears on the screen 19 can be used to measure the difference in the time of arrival of the sound waves at the receiver 13 and at the receiver 14. Thus, the properties and characteristics of the formation embraced in the sound path between said receivers may be readily determined.

In actual practice, it is desirable that the transmitter or oscillator 11 be continuously excited so as to continuously generate and transmit sound waves into the subsurface formations. It is also preferable that the receiving units be lowered continuously at a relatively slow rate and with a fixed spacing therebetween, whereby as the lowering continues, the receiving units successively occupy mean positions in the well bore. With such arrangement, a continuous reading or indication on the oscillograph screen is obtained and as the receivers 13 and 14 traverse the well bore, an accurate log or survey of the subformations is obtained. The use of the electrically operated transmitter, which may be continuously operated, makes it possible to accurately survey the entire vertical length of the bore, whereby every strata or formation, regardless of its thickness or thinness, may be determined. The method, herein disclosed, also permits accurate measurement of small time differences, which makes it possible to locate the receiving units relatively close to each other to further assure that every formation or strata is ascertained.

It is preferable that the two receiving units 13 and 14 be matched for impedance and phase angle so that the indicated difference in time shown by said receivers will be immediately available for computation. The receivers may be made relatively small in size to reduce the difficulty which might be encountered in lowering the same through the bore; also, said receivers could be constructed of a material which, in the event of a break in the cables 15 and 16, could be left in the bottom of the hole and subsequently ground up by the drill bit. This would greatly reduce the hazard of interfering with subsequent well drilling operations.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. An apparatus for determining characteristic differences between different geologic strata traversed by a well bore including, an electrical sound generator for continuously generating and transmitting sound into subsurface strata, a pair of vertically spaced sound receivers arranged to be lowered through the bore for receiving seismic waves, and a cathode-ray oscillograph electrically connected with the two receivers for recording difference in the arrival times of sound waves at the receivers, whereby the characteristics of the formation between the receivers may be ascertained.

2. An apparatus for determining characteristic differences between different geologic strata traversed by a well bore including, an electrical sound generator for continuously generating and transmitting sound into subsurface strata, a pair of vertically spaced sound receivers arranged to be lowered through the bore for receiving seismic waves, a cathode-ray oscillograph having deflection plates and a fluorescent screen having an electron beam focussed thereon, and means for electrically connecting the receivers to the deflection plates of said oscillograph, whereby the times of arrival of sound waves at said receivers are visibly recorded and the difference in such arrival times may be noted.

3. An apparatus for determining characteristic differences between different geological strata traversed by a well bore including, means for continuously generating sound waves in the vicinity of the well bore, a plurality of vertically spaced sound receivers arranged to be lowered through said bore for receiving said sound waves, a cathode ray oscillograph having a plurality of deflection plates and means electrically connecting said receivers to pairs of said plates whereby the phase difference between the sound waves arriving at said receivers is visibly indicated.

4. An apparatus for determining the characteristic difference between different geologic strata traversed by a well bore including means for generating sound waves in the vicinity of said well bore, a pair of vertically spaced sound receivers arranged to be lowered through said bore for receiving said sound waves and a cathode ray oscillograph having two pairs of deflecting plates and means electrically connecting said pairs of plates, one to one receiver and the other to another receiver, whereby the difference in the phase of the arrival of the sound waves of each receiver is indicated.

ROLAND F. BEERS.